United States Patent [19]

Weinhold

[11] 4,272,871
[45] Jun. 16, 1981

[54] HOSE COUPLING

[76] Inventor: Karl Weinhold, Im Jagdfeld 43, Neuss 4040, Fed. Rep. of Germany

[21] Appl. No.: 92,347

[22] Filed: Nov. 8, 1979

[30] Foreign Application Priority Data

Nov. 17, 1978 [DE] Fed. Rep. of Germany ....... 2849880

[51] Int. Cl.³ .............................................. F16L 37/20
[52] U.S. Cl. ...................................... 24/270; 24/273; 285/409
[58] Field of Search ............... 285/252, 365, 409, 411, 285/407, 408, 410, 366, 367, 91; 24/270, 273, 285, 284, 286

[56] References Cited

U.S. PATENT DOCUMENTS

| | | | |
|---|---|---|---|
| 2,362,454 | 11/1944 | Damsel | 285/112 |
| 2,775,806 | 1/1957 | Love | 285/411 X |
| 3,476,410 | 11/1969 | Pastva, Jr. | 285/365 X |
| 3,828,403 | 8/1974 | Perrin et al. | 285/365 X |
| 4,123,095 | 10/1978 | Stehlin | 285/409 |

FOREIGN PATENT DOCUMENTS 2001628 7/1971 Fed. Rep. of Germany .......... 285/365

Primary Examiner—Thomas F. Callaghan
Attorney, Agent, or Firm—Sherman & Shalloway

[57] ABSTRACT

A coupling for hoses and companion fittings comprising a circling clamp formed of a plurality of individually identical shell members or segments. Each shell segment includes, at a first end, a bore for receiving a connecting bolt and a projection for engaging a portion of a lock fastener. At the opposite end, each shell segment includes means for engaging the connecting bolt and companion means for carrying the releasable lock fastener.

4 Claims, 3 Drawing Figures

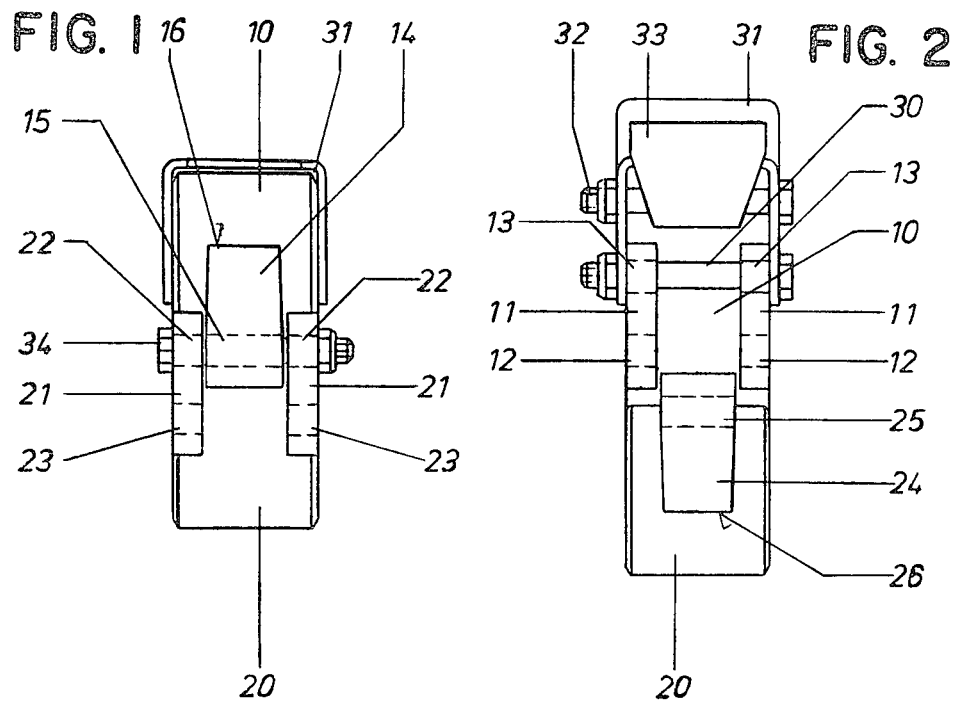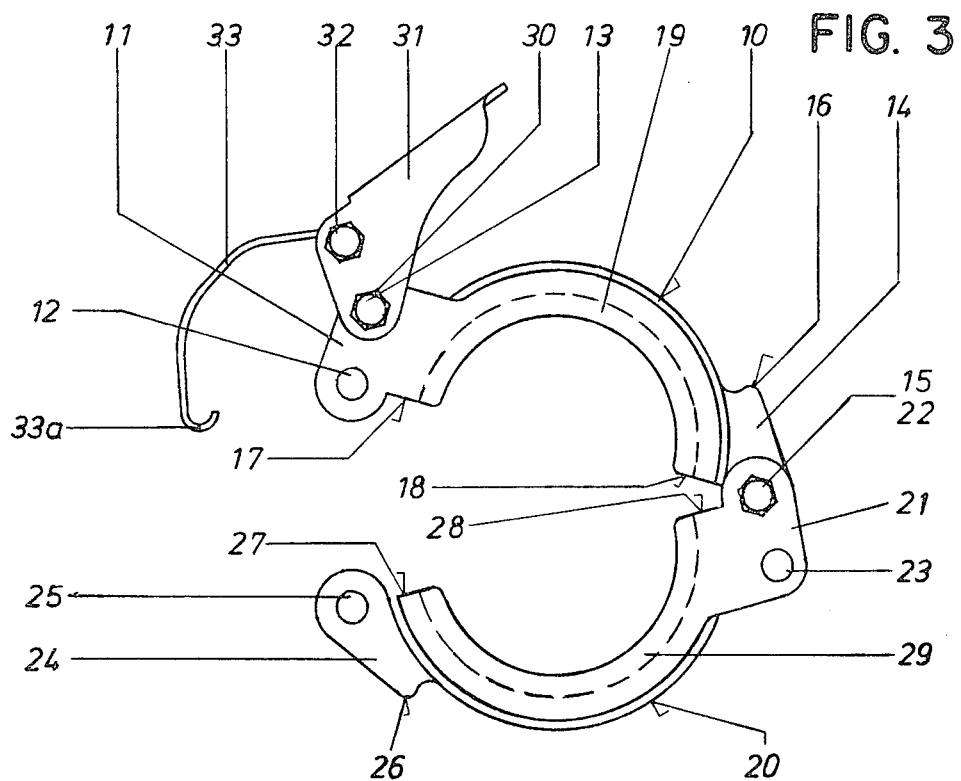

HOSE COUPLING

BACKGROUND OF THE INVENTION

The invention relates to a device for connecting tube or pipe ends. One such device has a tensioning lever lock formed from a tensioning lever and a spring and two shell parts, which are connected at one end by means of a hinge bolt, the hinge bolt penetrating the interengaging shell parts, while the opposite ends of the shells are pressed against each other by the tensioning level lock.

These devices have inwardly projecting flanges, in each case, on both sides of the shell halves, the flanges being capable of engaging behind an outer collar on a pipe end or on a nozzle, thus serving to attach a tube and/or being capable of pressing the tube intself on to the nozzle.

In all of the known prior art devices the shell halves are of different shape. This is due to the fact that the two shell halves are connected together differently in each case at opposite ends.

The necessity of two different types of shell brings about a corresponding expense in manufacture and stock-keeping.

SUMMARY OF THE INVENTION

The present invention seeks to reduce this expense and to create a device comprising two identical shell halves.

According to the invention, there is provided a coupling for connecting tube or pipe ends comprising a plurality of identical shell parts which when closed form a shell, each shell part having end portions at each end interengageable with the opposite end portions respectively of adjacent shell parts. Each end portion of each shell part is equally capable of receiving either a hinge bolt or one part of an operable fastening such as a toggle lock.

The operable fastening may comprise a tensioning lever lock formed from a tensioning lever and a spring. There may be only two shell parts, each shell part forming a shell half.

The uniformity of shape of the shell parts can lead to a substantial reduction in the cost of manufacture because, irrespective of whether the manufacture is effected by forging or by deep drawing for example, only one type of die or forming tool is required. Accordingly, only one type of shell part need by kept in stock. There can therefore be a substantial reduction in the cost.

Other advantages may be achieved at the same time however, one of which is that the shell parts which interengage in the region of the tensioning lever lock may form a positive abutment connection which is effective in an axial direction, the said positive connection ensuring the most exact abutment possible of the shell parts in this region.

Furthermore, it is advantageous that the device may, in addition, be secured and locked with the aid of a bolt which is passed through the bores of the interengaging shell parts after closing the shell parts by means of the tensioning lever lock. This type of locking can, for example, be very favourable if the tensioning lever suddenly opens as a result of some unexpected and uncontrollable external strain. With this, the safety bolt keeps the shell parts closed. Furthermore, it is also possible to exchange parts of the tensioning lever lock which may have been damaged if the device has been locked with the aid of a safety bolt.

Generally a bolt, which runs through a bore in the shell part or, in the case of a preferred embodiment of the end of the shell part with two arms in which there are bores, through these bores, may serve to fasten the tensioning lever pivotably to one shell part. These bores are not needed in the opposite shell parts and can serve to suspend the device from mountings and in many cases this is desirable. It is also advantageous if these bores are available in any case.

In an advantageous refinement of the invention each shell part may have a cam in which there is a bore and a projection formed as an abutment for the spring at one end and two tongues in which there are bores at the other end, such that the cam of one shell part can be inserted between the tongues of the adjacent shell part. In known embodiments, the spring of the toggle assembly usually engages in a slit which has to be formed into the shell part or the shell part is split and a bolt is provided over which the hook-shaped end of the spring engages. In both cases, it is not favourable for the shell part not to have an uninterrupted or completly continuous cross section. However this is possible if the abutment is formed as a projection. Furthermore, it is particularly advantageous that the cam is placed on the outer side of the shell part and the projection is arranged to serve as an abutment for the spring. Compact construction of the device is thereby assisted.

Furthermore, each tongue may be provided with a second bore and the bolt serving to pivotally fasten the tensioning lever may be passed through these bores.

This enables the tensioning lever axis to be in a favourable position and the tensioning lever to be fastened simply.

DETAILED DESCRIPTION OF THE PREFERRED EMBODIMENT

The invention will now be described in greater detail, by way of example, with reference to the drawings, in which:

FIG. 1 shows a view of a preferred form of the invention with its shell halves closed and taken from a direction running transverse to the longitudinal axis of the coupling:

FIG. 2 shows a view of the device with its shell halves open and taken from the opposite direction of the view of FIG. 1, and FIG. 3 shows a view of the device with its shell halves open and taken in an axial direction.

One shell half 10 of the device has two tongues 11 on one end. Each of the two tongues 11 is provided with a bore 12 which lies exactly on a diameter D of the shell halves. A further bore 13 has its center axis on an axis P perpendicular to the diameter first mentioned.

At the opposite end of the shell half 10 a cam projection 14, through which a bore 15 passes, is provided on the outer periphery thereof. The bore 15 also lies exactly on the same diameter D of the shell halves as the bore 12 in the other end of the shell half. The bores 12 and 15 also have the same spacing from the center of the circle or from the longitudinal axis of the coupling device.

The cam 14 located on to the shell half 10 is provided with a rim portion 16 which projects slightly towards the rear on its cam side opposite the bore 15. Furthermore, the shell half 10 also has flat surfaces 17 and 18 lying on the center diameter D and which constitute the end faces of the shell half 10. Radially, inwardly projecting flanges 19, behind which a collar on a pipe end or fitting are located on both axial sides of the shell half 10.

The second shell half 20 is identical in shape to the first shell half 10 and is given a different reference number only so that it is possible to distinguish it more easily on the drawings. The shell half 20 also has two tongues 21 at one end which are provided with two bores 22 and 23. The latter correspond in their position to the bores 12 and 13 of the shell half 10.

A cam 24 is again present with a bore 25 and a rim 26 lying on the rear side. The surface members 27 and 28 also lie on the center diameter. Side flanges 29 are only shown in FIG. 3.

A bolt 30, which serves to fasten a tensioning lever 31, is passed through the bore 13 of the shell half 10. A spring 33, which can engage with its free hook-shaped end 33a behind the rim 26 on the cam 24 of the shell half 20, is retained by the tensioning lever 31 with the aid of a further bolt 32.

A hinge bolt 34, by means of which the shell halves 10 and 20 are connected in hinged manner at one end, is passed through the bore 15 of the cam 14 and the bore 22 of the tongues 21. The bores 23 are located in the tongues 21 remain free initially; they can be used to fasten or suspend the device as desired.

If, when the shell halves 10 and 11 are closed, the end 33a of the spring 30 engages behind the rim 26 on the cam 24, then the axes of the bores 12 on the tongues 11 of the shell half 10 and the axis of the bore 25 in the cam 24 on the other shell half 20 coincide so that a safety bolt (not shown) can be passed through these bores. The surfaces 17 and 27 as well as 18 and 28 then abut along the diameter to close the circle.

All of the bores mentioned here have the same diameter. Since the shell halves 10 and 20 are identical in shaped, it is of course conceivable to pass the hinge bolt 34 through the boreholes 12 and 25 and to fasten the tensioning lever 31 by means of its bolt 30 in the boreholes 23 of the tongues 21 on the shell half 20.

Although until now reference has only been made to shell halves, the invention should however also be extended to the use of shells the curve angles of which are defined by subdividing the periphery into more than two parts. More particularly, in the case of fairly large diameters and/or in the case of a heavy and solid embodiment of the shells, it is favourable in many cases to provide three, four or even more shells of the same construction which are distributed around the periphery of the device.

Furthermore, the invention is provided by the provision of part shells whose shape is the same irrespectively of whether any fastening elements etc. are arranged on individual shells of the device, after manufacture of the shell parts themselves, for certain purposes.

What we claim is:

1. An apparatus for connecting pipe or hose ends comprising at least two identical shell members which are connected at one end by means of a hinge bolt, and other ends of the shells being pressed together by a tensioning lever and a spring, the tensioning lever being mounted to the shell member by way of a bolt in a bore penetrating a part of the shell member, characterized in that the ends of the shell members pressed together by the tension lever have interlocking tongue (11) and cam (24) which are provided with another bore (12,25) through which another hinge bolt is passed.

2. The apparatus of claim 1 wherein each of the shell members (10,20) has at one of the ends thereof a drilled through can (14,24) and a rim portion (16,26) adapted to be an abutment for the spring (33) and at the other end thereof two drilled through tongues (11,21) between which the cams (14,24) of the shell members are inserted.

3. The apparatus of claim 2 wherein the cams (14,24) are disposed on the outside surface of the shell members (10,20) and form at the same time projections (16,26) each of which is adapted to be an abutment for the spring (33), 4. The apparatus of claim 1, 2 or 3 wherein two shell members (10,20) are used to form the apparatus; each of the tongues (11,21) is provided with a bore (12,22) adapted for the reception of a connecting bolt (34); and each of the cams (14,24) is provided with a bore (15,25) which penetrates the cams, lies on a line extending through the diameter of the formed apparatus and is disposed at the same distance from the central axis of the apparatus.

* * * * *